United States Patent Office 3,136,734
Patented June 9, 1964

3,136,734
HALOGENATED FULVALENE VULCANIZING AGENTS FOR SATURATED ELASTOMERS
Peter E. Wei and John Rehner, Jr., Westfield, N.J., assignors to Esso Research and Engineering Company, a corporation of Delaware
No Drawing. Filed Mar. 5, 1962, Ser. No. 177,178
13 Claims. (Cl. 260—41)

This invention relates to saturated elastomeric compositions of matter which are made curable by the addition of a halogenated fulvalene compound.

It has heretofore been known to vulcanize high unsaturation elastomers, such as natural rubber, with sulfur and certain mild accelerators, such as derivatives of guanidine and thiazole. Low unsaturation elastomers, such as butyl rubber, have been vulcanized with somewhat greater difficulty by the use of sulfur, zinc oxide, and accelerators such as dithiocarbamates and thiuram derivatives. However, these curing agents are ineffective as vulcanizers for elastomers of no unsaturation at all. By this invention it has surprisingly been found that fully saturated elastomers may be cure with the use of a halogenated fulvalene in combination with sulfur and/or zinc oxide.

More specifically, to 100 parts of elastomer is added between about 0.5 to 5 parts by weight of sulfur and/or zinc oxide, preferably 1 to 3 parts, and 1 to 15 parts by weight of a halogenated fulvalene, preferably 2 to 10 parts. The resulting mixture is then heated to yield a vulcanizate. To further improve the process, various fillers such as clays, silicates, and carbon black (0–200 parts), and metallic compounds, such as ferric oxide, cadmium oxide, magnesium oxide, aluminum oxide, ferric carboxylates, or $FeCl_3$ may be added to the mixture.

The elastomers to which this invention is applicable are those rubbery compositions which are fully saturated (i.e. contain no ethylenic unsaturation). Preferred among these are substantially amorphous polymers and copolymers prepared by the "low pressure" process. This process is generally described in the literature, e.g. see Scientific American, September 1957, page 98 et seq., and Belgian Patent 538,782. These rubbery polymers include $C_2$–$C_5$ alpha olefin homopolymers, such as polyethylene and polypropylene, as well as the more preferred copolymers of ethylene and $C_3$–$C_5$ alpha olefins. Most preferred is the copolymer of ethylene and propylene.

This invention is also applicable to blends of the above-described elastomers with other rubbers such as natural rubber, butyl rubber, polyisobutylene, and butadiene-styrene.

For the purpose of convenience, details of the "low pressure" polymerization process are here presented although it should be realized that these by themselves constitute no part of the invention. In that process alpha olefin monomers are polymerized with the aid of catalysts which are obtained by complexing a heavy metal compound, such as vanadium or titanium tetrahalide with an aluminum alkyl compound, such as aluminum triethyl, aluminum triisobutyl, aluminum diethyl chloride, etc.

The polymerization is effected in the presence of inert hydrocarbon solvents at temperatures of about 0°–100° C. and pressures which usually range between 0 and 100 p.s.i.g. When the desired degree of polymerization has been reached, a $C_1$–$C_8$ alcohol is added to the reaction mixture for the purpose of dissolving and deactivating the catalyst and for precipitating the polymer product from solution. The solid polymer may then be separated by filtration, washed, dried and compacted.

The halogenated fulvalene compounds suitable for this invention can be represented by the formula below

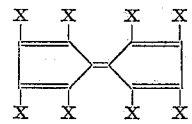

where at least one X is a halogen selected from the class consisting of chlorine, bromine, and iodine, and those X's which are not halogens are hydrogen atoms. Preferred among these compounds are the perhalofulvalenes, wherein all of the X's are halogens. Particularly preferred is perchlorofulvalene, wherein each X is a chlorine atom. The properties and preparation of these fulvalene compounds is described in the literature by E. T. McBee et al., Journal of the American Chemical Society, Vol. 77, pages 4375 and 4942.

Other halogenated organic compounds also have some utility in curing the elastomers of this invention. These include hexachloromelamine, chlorohydantoin, perhaloaliphatic ethers and thioethers, halogenated pyrroles, imidazoles, diazines, pyridines, tetrazines, and ring substituted haloazine and haloimide compounds.

The vulcanization is effected by thoroughly contacting the elastomer with the curing mixture e.g., on a rubber mill, or in a Banbury mixer, and subjecting the resulting mixture to temperatures of 250 to 450° F., preferably 280 to 350° F. for from 1 to 120 minutes, preferably 10 to 60 minutes. Alternatively the mixture components may be mixed in a masterbatch and then heated to vulcanizing temperatures to thereby decrease the mixing time and improve the processability of the uncured elastomer.

This invention and its advantages will be better understood by reference to the following examples.

EXAMPLE 1

An elastomeric ethylene-propylene copolymer was cured with the use of perchlorofulvalene with the results as given below.

*Perchlorofulvalene as Vulcanizing Agent for Ethylene-Propylene Rubber*

|   | A | B | C |
|---|---|---|---|
| Ethylene-propylene rubber [a] | 100 | 100 | 100 |
| HAF carbon black | 50 | 50 | 50 |
| Sulfur | 1 | 1 | 1 |
| Zinc oxide | 2 | 2 | 2 |
| Perchlorofulvalene | 0 | 5 | 10 |
| Cured at 320° F. for 30 minutes: |   |   |   |
| Tensile strength, p.s.i | 450 | 720 | 1250 |
| Elongation, percent | 630 | 500 | 600 |
| Cured at 335° F. for 30 minutes: |   |   |   |
| Tensile strength, p.s.i |   | 750 | 1350 |
| Elongation, percent |   | 500 | 600 |
| Cured at 335° F. for 60 minutes: |   |   |   |
| Tensile strength, p.s.i | 410 | 920 | 1650 |
| Elongation, percent | 580 | 500 | 500 |

[a] The rubber contained 62 mole percent of ethylene units, had an intrinsic viscosity of 5.12 (as measured in dilute decalin solution at 135° C.), a Mooney plasticity of 93 (measured in 8 minutes at 212° F.), and it contained 22.5% by weight of toluene-insoluble material.

As can be seen from the above data, the elastomer could not be cured with sulfur and zinc oxide; however, excellent cures may be obtained by using perchlorofulvalene in combination with them.

The advantages of this invention will be apparent to those skilled in the art. Saturated elastomers are cured to provide products of high tensile strength having substantially no odor and with satisfactory physical characteristics.

This invention has been described in connection with certain specific embodiments thereof; however, it should

What is claimed is:

1. A composition of matter comprising a saturated rubbery elastomer derived from an alpha olefin, cured with a halogenated fulvalene wherein the halogen is selected from the class consisting of chlorine, bromine and iodine, and at least one compound selected from the class consisting of sulfur and zinc oxide.

2. A composition of matter according to claim 1 wherein the saturated rubbery elastomer is a copolymer of ethylene and a $C_3$–$C_5$ alpha monoolefin.

3. The composition of claim 2 wherein the halogenated fulvalene is perchlorofulvalene.

4. The composition of claim 3 which contains both sulfur and zinc oxide.

5. The composition of claim 4 which additionally contains 0 to 200 parts by weight of carbon black per 100 parts of elastomer.

6. A process for curing a saurated rubbery elastomer derived from an alpha olefin which comprises heating the elastomer to a temperature in the range of 250 to 450° F. in the presence of vulcanizing amounts of a halogenated fulvalene and at least one compound selected from the class consisting of sulfur and zinc oxide.

7. The process of claim 6 wherein 0 to 200 parts of carbon black is added prior to vulcanization.

8. A vulcanizable composition of matter comprising a saturated rubbery elastomer derived from an alpha olefin mixed with 1 to 15 parts of a halogenated fulvalene per 100 parts of elastomer.

9. The composition of claim 8 which additionally includes 0.5 to 5 parts of at least one compound selected from the class consisting of sulfur and zinc oxide, per 100 parts of elastomer.

10. The composition of claim 8 wherein the elastomer is a copolymer of ethylene and a $C_3$–$C_5$ alpha olefin.

11. The composition of claim 8 wherein the elastomer is the copolymer of ethylene and propylene.

12. The composition of claim 11 wherein the halogenated fulvalene is perchlorofulvalene.

13. The composition of claim 12 wherein 2–10 parts of perchlorofulvalene per 100 parts of elastomer are present in the composition.

No references cited.